United States Patent
Vajda et al.

(10) Patent No.: US 9,496,590 B2
(45) Date of Patent: Nov. 15, 2016

(54) LITHIUM-AIR BATTERIES, METHOD FOR MAKING LITHIUM-AIR BATTERIES

(71) Applicants: Stefan Vajda, Lisle, IL (US); Larry A. Curtiss, Downers Grove, IL (US); Jun Lu, Bolingbrook, IL (US); Khalil Amine, Oakbrook, IL (US); Eric C. Tyo, Lisle, IL (US)

(72) Inventors: Stefan Vajda, Lisle, IL (US); Larry A. Curtiss, Downers Grove, IL (US); Jun Lu, Bolingbrook, IL (US); Khalil Amine, Oakbrook, IL (US); Eric C. Tyo, Lisle, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 312 days.

(21) Appl. No.: 14/042,203

(22) Filed: Sep. 30, 2013

(65) Prior Publication Data

US 2015/0093658 A1 Apr. 2, 2015

(51) Int. Cl.
| | |
|---|---|
| H01M 4/36 | (2006.01) |
| H01M 12/08 | (2006.01) |
| H01M 4/90 | (2006.01) |
| C01D 15/02 | (2006.01) |
| H01M 4/38 | (2006.01) |

(52) U.S. Cl.
CPC ............ *H01M 12/08* (2013.01); *C01D 15/02* (2013.01); *H01M 4/38* (2013.01); *H01M 4/382* (2013.01); *H01M 4/9058* (2013.01); *H01M 2220/20* (2013.01); *H01M 2300/0028* (2013.01); *H01M 2300/0037* (2013.01)

(58) Field of Classification Search
CPC .................. H01M 12/08; H01M 4/9058
See application file for complete search history.

(56) References Cited

U.S. PATENT DOCUMENTS

| | | | |
|---|---|---|---|
| 7,582,586 B2 * | 9/2009 | Fanson | C07C 45/50 502/162 |
| 8,143,189 B2 | 3/2012 | Vajda et al. | |
| 8,148,293 B2 | 4/2012 | Vajda et al. | |
| 2009/0233790 A1 * | 9/2009 | Vajda | B01J 23/42 502/334 |
| 2010/0143807 A1 * | 6/2010 | Khasin | B01J 21/066 429/405 |
| 2011/0059355 A1 * | 3/2011 | Zhang | H01M 4/8647 429/188 |
| 2011/0200884 A1 * | 8/2011 | Uchida | H01M 4/139 429/245 |
| 2013/0137002 A1 * | 5/2013 | Lee | H01M 4/382 429/405 |
| 2013/0209919 A1 * | 8/2013 | Amendola | C25B 11/035 429/520 |

OTHER PUBLICATIONS

Zhong-Li Wang, Dan Xu, Ji-Jing Xu, Lei-Lei Zhang, and Xin-Bo Zhang, "Graphene Oxide Gel-Derived, Free-Standing, Hierarchically Porous Carbon for High-Capacity and High-Rate Rechargeable Li—O2 Batteries", Advanced Fucntional Materials vol. 22, Issue 17, pp. 3699-3705, May 18, 2012.*

* cited by examiner

*Primary Examiner* — Jonathan Jelsma
(74) *Attorney, Agent, or Firm* — Cherskov Flaynik & Gurda, LLC (57) ABSTRACT

The invention provides a method for generating $Li_2O_2$ or composites of it, the method uses mixing lithium ions with oxygen ions in the presence of a catalyst. The catalyst comprises a plurality of metal clusters, their alloys and mixtures, each cluster consisting of between 3 and 18 metal atoms. The invention also describes a lithium-air battery which uses a lithium metal anode, and a cathode opposing the anode. The cathode supports metal clusters, each cluster consisting of size selected clusters, taken from a range of between approximately 3 and approximately 18 metal atoms, and an electrolyte positioned between the anode and the cathode.

19 Claims, 7 Drawing Sheets

LITHIUM-AIR BATTERIES, METHOD FOR MAKING LITHIUM-AIR BATTERIES

CONTRACTUAL ORIGIN OF THE INVENTION

The United States Government has rights to this invention pursuant to Contract No. DE-AC02-06CH11357 between the United States Government and UChicago Argonne, LLC representing Argonne National Laboratory.

BACKGROUND OF THE INVENTION

1. Field of the Invention

The present invention is related to batteries and a method for making batteries, and more specifically, the present invention is related to Lithium-Air batteries and a method for making Lithium-Air batteries.

2. Background of the Invention

The advancement and acceptance of electric cars has been hampered due to the lack of suitable batteries. Indeed, the 46 MJ/kg specific energy of gasoline makes replacement of this energy-dense fuel a daunting task. The theoretical specific energy of Li-air batteries is about 18.7 MJ/kg including oxygen. However, since oxygen is constantly drawn from the air for this battery, theoretical specific energy is increased to about 40.1 MJ/kg if the battery's oxidizer (oxygen) is not factored into the weight. This very closely approximates the specific energy of gasoline.

Due to engine inefficiencies, both gasoline and Li-air batteries are predicted to achieve a practical specific energy of 1,700 Wh/kg, which is several folds higher than most existing battery systems. This feature makes Li-air batteries ideal for long-range electric vehicles.

Li—$O_2$ batteries are based on the use of an electrochemical transformation wherein formation of Li—O bonds occurs during battery discharge and the breaking of those bonds occur during charging of the battery. A porous oxygen gas-permeable cathode is used to store the solid products generated from the reaction of Li cations with oxygen gas. The general reactions of the redox sequence are presented as Equations 1-5, below:

Anode Reaction $Li_{(s)} \rightarrow Li^+ + e^-$      Equation 1

Cathode Reaction $2Li^+ + 2e^- + O_2 \leftrightarrow Li_2O_2$      Equation 2

Cathode Reaction $2Li^+ + 2e^- + 0.5O_2 \rightarrow Li_2O$      Equation 3

Cathode Reaction $Li + e^- + O_2 \leftrightarrow LiO_2$      Equation 4

Cathode Reaction $2LiO_2 \leftrightarrow Li_2O_2 + O_2$      Equation 5

During discharge, lithium metal from the anode is oxidized to lithium cation during reduction of oxygen gas at the cathode to oxygen ion. The reverse redox occurs during recharging of the battery.

Despite the aforementioned promising specific energy values, state of the art Li-air batteries lag in several performance parameters. For example, their reported specific energy is 362 Wh/kg. While this is about 100 percent higher than Li-ion batteries, Li-air batteries only achieve 21 percent of expected practical value. Also, the specific power of Li-air batteries is about 10 percent of present Li-ion batteries.

Also, while power density is an essential parameter in electric propulsion, Li-air batteries are low in power density. During discharge, oxygen is reduced to form lithium-oxides. The charging cycle reverses this chemical reaction and produces oxygen gas. Both processes take place at the cathode surface. So to ensure satisfactory power output, a high surface area cathode is preferred. Li-air batteries fall short in round-trip efficiency, which is the ratio of energy discharged to the energy needed during charging. While 90 percent round trip efficiency is preferred for electric propulsion, Li-Air batteries with pure carbon cathodes display much lower efficiencies.

Life cycle is another limitation as Li-air batteries degrade after a very limited number of cycles. Per the equations above, lithium oxides form during discharging cycle as lithium ions are transferred to the cathode to react with incoming oxygen. The recharging process involves the reduction of lithium oxides ($Li_2O$ and $Li_2O_2$). However, $Li_2O$ is difficult to charge due to the broken O2 bond, as noted in Equation 3 above. Instead, it accumulates in the pore volume of the cathode, resulting in ultimate failure of the cathode. Separately, instability of electrolyte is a major cause of poor cycle life.

A need exists in the art for a lithium-air battery which has round trip efficiencies above approximately 90 percent. The battery should also have extended lifetimes of at least about 1000 discharge/charge cycles. Also, the battery should utilize only minimal amounts of expensive catalytic material (e.g., gold, silver, platinum, palladium) so as to make it accessible to a wider swath of car buyers.

SUMMARY OF INVENTION

An object of the invention is to provide a Lithium-Air battery that overcomes many of the disadvantages of the prior art.

Another object of the present invention is to provide a Lithium-Air battery and a method for producing a Lithium-Air battery. A feature of the invention is that subnanometer sized metal clusters of exact size are deposited on a carbon support which is first partially covered with alumina. Alumina coverage can range from between about 10 percent and about 90 percent of a side of a cathode support, and preferably between about 20 and about 50 percent.

Yet another object of the present invention is to provide a lithium-air battery for use in electric cars. A feature of the invention is the creation of specific morphologies of lithium peroxide moieties onto a cathode. An advantage of the invention is that the morphologies facilitate more efficient redox reactions during battery discharging and recharging. For example, certain size catalyst clusters result in discharge products with low charge over potentials. This is because these certain sized (i.e., size-selected or predetermined number of metal atoms in each cluster) catalyst clusters facilitate the generation of lithium peroxide moieties which can be more efficiently charged (e.g., ionized) than $Li_2O$. The inventors found that certain size clusters (for example clusters consisting of 15 atoms of metal) generate lithium peroxide that has lower charge over potential.

Still another object of the present invention is to provide a method for producing Lithium-Air batteries having high energy densities and life cycles. A feature of the present invention is that the fabrication method includes a step for covering over, and therefore eliminating the effect of, defect sites in cathodes, so that the sites do not participate in electrocatalytic reactions. An advantage of the present invention is that the coating that covers over the defects prevents decomposition of electrolyte solvent, which otherwise limits cycle life of the battery. The blocking, healing, or otherwise isolating of (or the blocking of) defect sites extends solvent life and cathode life, and therefore extends the cycle life of the battery.

Briefly, the invention provides a method for generating a nonstoichiometric mixture of $Li_{2-x}O_2$ wherein x is an integer between 0 and 2. Examples of target lithium compounds include, but are not limited to $Li_2O_2$, or a mixture of $Li_2O_2$ with other lithium oxides such as $LiO_2$, crystalline lithium oxides such as $O_2^{-2}$ $2Li+$, and lithium super oxides such as $O^{2-}Li^+$. The method comprises reacting lithium ions with oxygen ions in the presence of a catalyst, whereby the catalyst comprises a plurality of metal clusters, each cluster consisting of between 3 and 100 metal atoms, preferably between 3 and 50 atoms and most preferably between 3 and 20 atoms.

Also provided is a lithium air battery comprising a lithium metal anode, a cathode opposing the anode, the cathode supporting metal clusters, each cluster consisting of between 3 and 100 metal atoms, preferably between 3 and 50 atoms and most preferably between 3 and 20 atoms, and an electrolyte positioned between the anode and the cathode. An embodiment of the invention comprises clusters all consisting of 15 atoms.

BRIEF DESCRIPTION OF DRAWING

The invention together with the above and other objects and advantages will be best understood from the following detailed description of the preferred embodiment of the invention shown in the accompanying drawings, wherein:

FIG. 4A-E are voltage profiles for various sized metal clusters and for a support without clusters, in accordance with features of the present invention;

FIG. 5A-D comprise a plurality of SEM images of products created by various sized metal cluster catalysts, in accordance with features of the present invention;

FIG. 6A-D depict TEM photographs of reaction products and chart of results, in accordance with features of the present invention.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
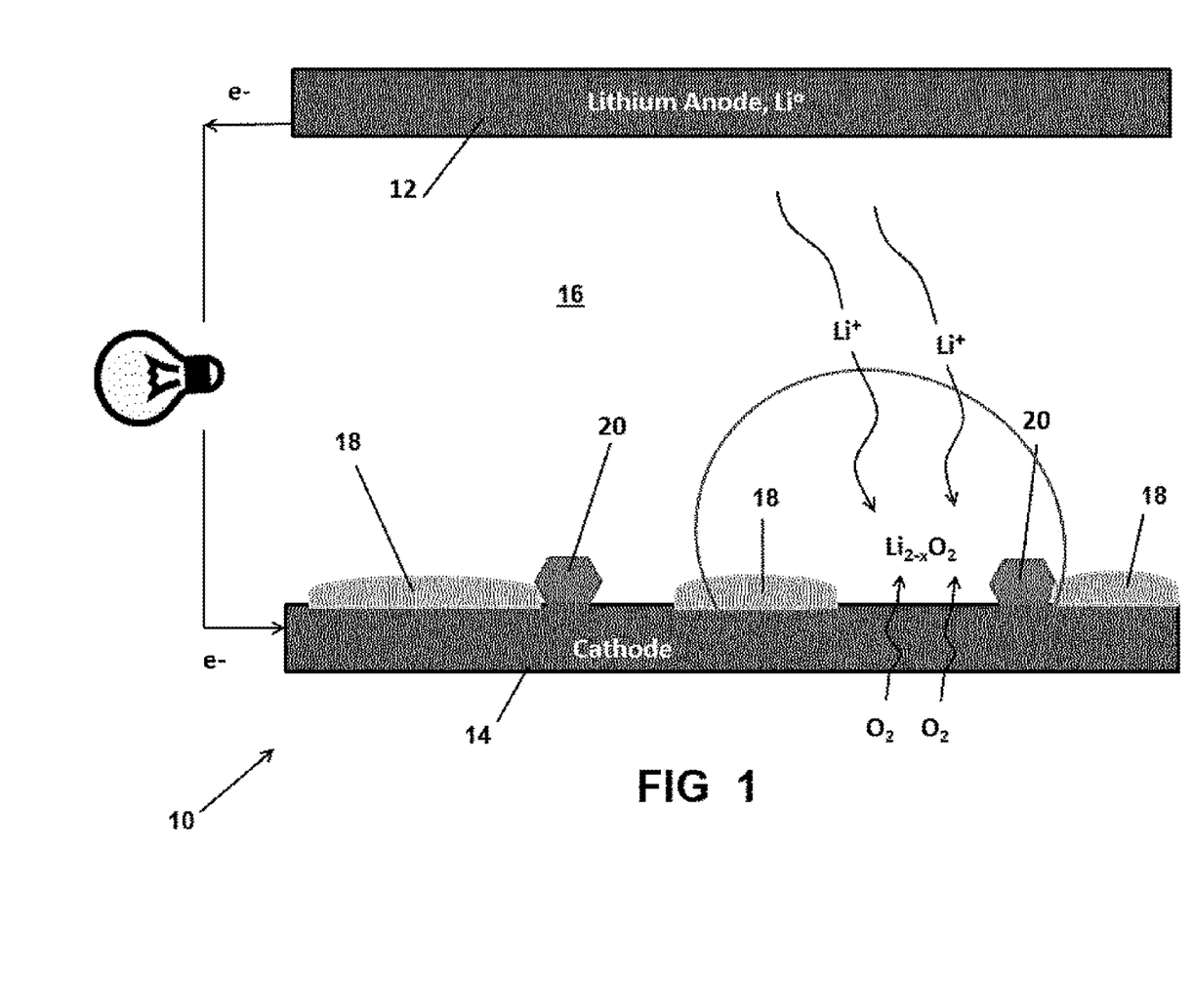
FIG. 1 is a schematic depiction of a Lithium Air battery, in accordance with features of the present invention.

In an embodiment of the invention, designated as numeral 10 in FIG. 1, metal clusters 20 of a predetermined size (e.g., comprising 4, 9, 15, and/or 18 atoms) are supported by a cathode 14. Prior to deposition of the clusters on the cathode, defect sites on the cathode are physically covered, for example with an alumina coating 18. Such defect sites are inherent in some cathode substrate materials such as Super P Carbon, Ketjen Black, Graphatized Carbon, and combinations thereof, with the sites containing hydroxyl groups, carbonyl groups, or missing carbons from the lattice structure of the substrate. However, some cathode substrates, such as activated carbon, have no defect sites such that pre-cluster deposition coatings are not always warranted. Rather, the clusters are directly deposited onto the cathode substrate.

Metal clusters are deposited either on the coating 18 or directly on the cathode 14. By combining these well-defined cluster sizes with defect free cathode surfaces or with passivation of carbon defect sites, (such defect sites which otherwise might act as catalytic sites for unwanted reactions), the resulting cathode architecture provides for a well characterized cathode for studying the dependence of electrical discharge on catalysts and also for enabling the generation of electrochemically active redox products which more easily revert to their constituents during battery recharging.

Surprisingly and unexpectedly, the metal cluster size effects the morphology of the discharge product. This is due to the clusters acting as catalysts to promote oxygen reduction as well as providing nucleation mechanisms that give different states of lithium peroxide, some of which have lower charge potentials for increased efficiency.

For example, clusters comprised of 15 atoms are more active for oxygen reduction than some other clusters because of a smaller HOMO/LUMO gap compared to the other clusters. The inventors observed nanocrystalline discharge product with grain boundaries for the 15 atom clusters (compared to nanorods and plates with no grain boundary network for electronic conduction of the other cluster types). Nanocrystalline type clusters with grain boundaries facilitates electronic conductivity of the discharge product, and therefore electron transfer across the gap, from the cathode surface to the top of the cluster. This results in a lowering of any the charge overpotential by about 0.7 V when specific sized silver clusters are utilized. This lowering of over potential makes the battery more efficient.

Electrode Fabrication Detail

Conductive graphitized carbon (GC) was used as the catalyst support material 14. However, other substrates are suitable as cathode material such as graphitized carbon, Super P, carbon nanotubes, carbides, diamond, spheres, graphene, and combinations thereof. Generally, any electrically conductive support material which is not itself reactive with battery chemistry moieties is suitable.

In instances where cathode substrates contain defects (such as hydroxyl groups or missing carbons), preferably those defects are covered with films of oxides carbides, nitrides or combinations thereof, with the films being of a thickness to still facilitated electrical conductivity with the underlying cathode. In an embodiment of the invention, graphitized carbon is coated with $Al_2O_3$ 18 by ALD, to a thickness to passivate the defects on the carbon surface. Generally such passivating films can be up to about 1 nm thick, and preferably about 0.5 nm thick, and covers up to about 50 percent of the cathode surface, preferably between about 5 and 30 percent of the area and most preferably about 12 percent. Up to 1 nm of the Alumina film is electrically conductive and can act as a support for the metal clusters. A plurality of passivating films can be applied to arrive at the desired thickness.

Size-selected Metal$_n$ (n=3, 9, 15, 18) clusters (such as Ag, Cu, Au, Ni, Pd, Pt, Zn, Mn, Co, and combinations thereof) are soft-landed on alumina coated graphitized carbon under identical deposition and coverage conditions and surface coverage. The clusters contact the surface so as to bond with it. Surface coverage averages less than 50 percent, preferably between about 5 and about 30 percent, and most preferably between 10 and 20 percent. In an embodiment of the invention, about 12 percent of the surface is covered with metal clusters. A molecular beam of metal clusters (such as silver clusters) was produced by DC (direct current) magnetron sputtering of a silver target using a mixture of helium and argon. Next, the beam is guided through an ion guide system consisting of a conical octupole ion guide, a linear octupole ion guide, and a quadrupole mass filter. The mass-selected, positively charged cluster ions of single size (i.e., with the exact number of atoms in the cluster) were deposited on the support 14, i.e., the cathode. (Varying voltage of the cluster generator can result in a soft landing of the cluster.) The amount of deposited metal was determined by real-time monitoring of the deposition flux. Soft landings of clusters prevent degradation of the clusters as well as preventing embedment of the clusters into the cathode upon deposition.

Surprisingly and unexpectedly, the TEM images show that when a metal cluster contacts the support surface, it often simultaneously travels to the deepest valley on that surface, or else attached to binding sites (those sites on the alumina films, the defect sites, or at alumina-support interfaces) of adjacent surfaces. This is particularly so when the cluster "soft lands" on the support. This travel is facilitated by the thermal energy embodied in the cluster. Alternatively, the cluster gravitates to under-coordinated points of alumina coatings deposited at certain regions of the support. In instances where passivation coatings are first utilized, when the metal clusters are finally deposited onto the cathode, the clusters land everywhere, not just on the alumina.

Notwithstanding the foregoing, the inventors observed that when cluster "pinning" occurs, which is the forceful impact of a cluster to the support and therefor the opposite of a soft landing, no cluster migration takes place. Pinning occurs via forceful impact of the cluster onto the surface such that the clusters are literally pinned to the substrate by friction or otherwise. For example, the forceful impact creates small craters in the surface which creates disrupted bongs (e.g. defects) to which the cluster binds. Pinning is appropriate when supports having no defects are utilized. Such supports include, but are not limited to graphitized carbon, carbides, amorphous carbon, diamond and combinations thereof. When supports having defects are over coated with oxides (such as alumina), nitrides or carbides (or their combinations) of other metals such as but not limited to W, Zr, Ti, Zn, Zr, pinning may also be utilized, particularly in instances where cluster migration is to be minimized or where exact cluster placement is desired.

Cluster Detail

A myriad of metals are suitable as catalysts, including, but not limited to Ag, Cu, Au, Ni, Pd, Pt, Zn, Mn, Co, their alloys, in bulk non-alloying metals and combinations thereof. A cluster containing metals not alloyable otherwise, is possible when the metals exist as individual atoms but nevertheless "in bulk" with each other. A continuous beam of clusters is generated in a cluster apparatus, designated in FIG. 2 as element 22. The apparatus utilizes a magnetron sputtering source 24 and a high throughput ion optics/mass filter assembly 26. In an embodiment of the invention, the assembly 26 comprises a focusing conical octupole ion guide 28, a linear octupole ion guide 30, a linear quadrupole 32 and ion lenses 34 whereby all of these components are coaxially positioned relative to each other.

Figure 2:
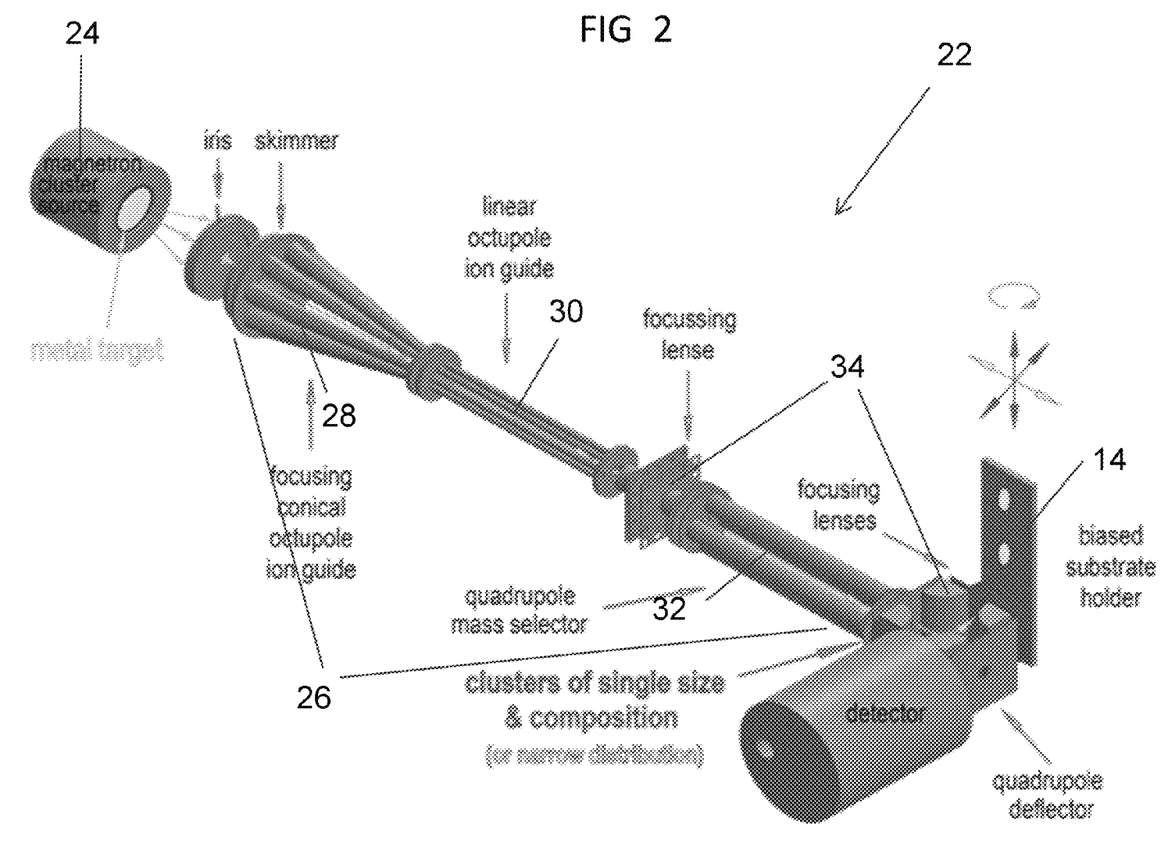
FIG. 2 is a schematic depiction of a device for generating size selected clusters, in accordance with features of the present invention.

A quadrupole bender deflects or otherwise directs the ion beam orthogonally to remove any neutral clusters from the beam before deposition. The inventors found that the conical octupole ion guide 28 optimizes the cluster collection process such that at least 10 times more clusters of a specific atom number are collected compared to instruments not utilizing a conical octupole ion guide.

The sized-cluster beam passes through a mass filter, which is a mass- and size-selecting quadrupole that restricts the passage of species to those of a desired size and composition. Subsequently, the size- and composition-selected clusters are extracted from the beam using a quadrupole deflector and soft-landed on technologically relevant flat and patterned surfaces. The mass filter allows for the selection of cluster size (i.e. number of atoms in the cluster) and cluster composition with atomic precision. Every cluster contains a charge, and upon contact with a conducting support the charge is carried through the support creating a current. To determine the quantity of clusters landing on the support substrate 14, the current is measured across the entire substrate and monitored for the duration of the deposition.

The cluster source creates a plasma. Within the plasma, positive, negative, and neutral clusters are created. The cluster source can generate neutral, positively charged, as well as negatively charged clusters. Both negatively and positively charged clusters could be used for deposition. During landing on the support, cluster charge is neutralized by the current through the picoampermeter used for measuring flux (charge of clusters). In an embodiment of the method for producing cluster, only positively charged clusters are allowed to enter the instrument. (Preferably, a cluster has a charge so as to be electrostatically filterable or otherwise manipulated and directed.) Negatively charged clusters are also suitable.

Mono- and multi-metallic cluster fields, as well as composite clusters (catalysts), can be produced. For the production of mixed (i.e. multicomponent) clusters one can use an alloy target or two pieces of metal. The latter option allows for the production of mixed clusters made of metals which would not alloy within the bulk of the individual cluster. Clusters comprised of all one element can be intermingled with clusters comprised of a different element. Alternatively, single clusters can be comprised of different elements. For example, clusters can be created using an alloy target $Ag_mPt_n$. The clusters created in the source at the same time are $Ag_n$, $Pt_n$, and $Ag_mPt_n$.

Clusters of composition $X_{n-1}Y_1$ can be created as well as $X_1Y_{n-1}$ and all combinations between, wherein X defines one element, and Y defines another. Each individual combination can be selectively deposited to investigate how unique ratios of elements influence their reactive and material characteristics.

Generally individual clusters range in size from about 0.2 nm to about 3 nm, with typical cluster sizes averaging about 0.5 nm to about 1 nm in diameter. This size is determined by measuring across the largest diameter of the cluster.

The cluster device as depicted in FIG. 2 is a suitable cluster generator. An alternative cluster source is one based on laser vaporization of the metal. One such alternative source is disclosed in U.S. Pat. No. 8,148,293, the entirety of which is incorporated by reference, with the lenses of that system replaced by focusing octupole. Generally, suitable ion guides and quadrupoles are commercially available, for example at Extrel CMS, Pittsburgh, Pa.

Example

The following example features size-selected silver clusters. However, other metals are suitable, as mentioned supra, with the only limiting parameter being the atomic mass unit of the metal chosen to be deposited with a particular cluster generator. For example, silver's 107 AMU is roughly twice that of copper, which means that twice as many clusters of copper will need to be produced to provide similar mass loading on a substrate. High capacity cluster generators, the capacity of which are defined by commercially available mass selecting quadrupoles, remove any limitation to the amu of elements to be deposited.

Figure 3A:
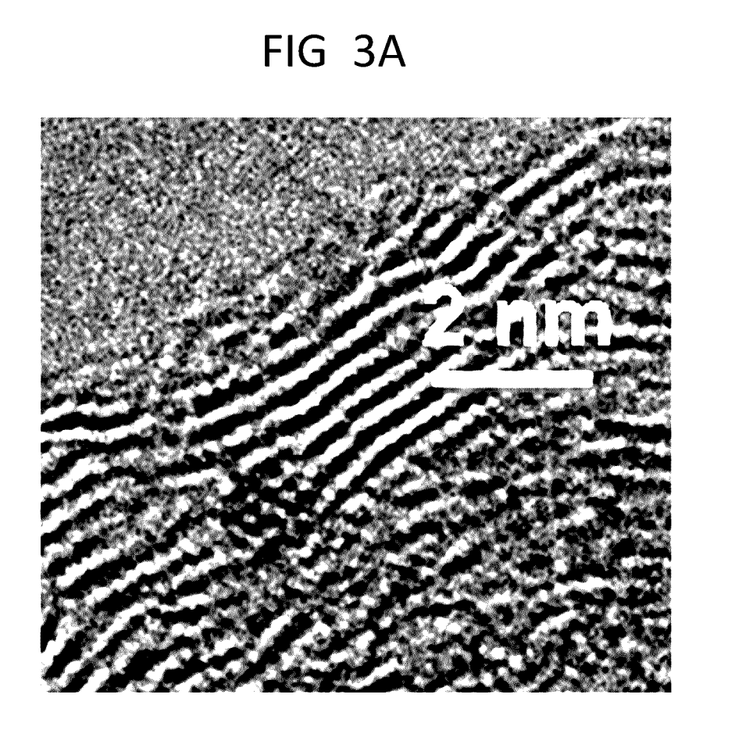
FIG. 3A is a TEM image of a 15-atom metal cluster on a cathode before battery discharge, in accordance with features of the present invention.
Figure 3B:
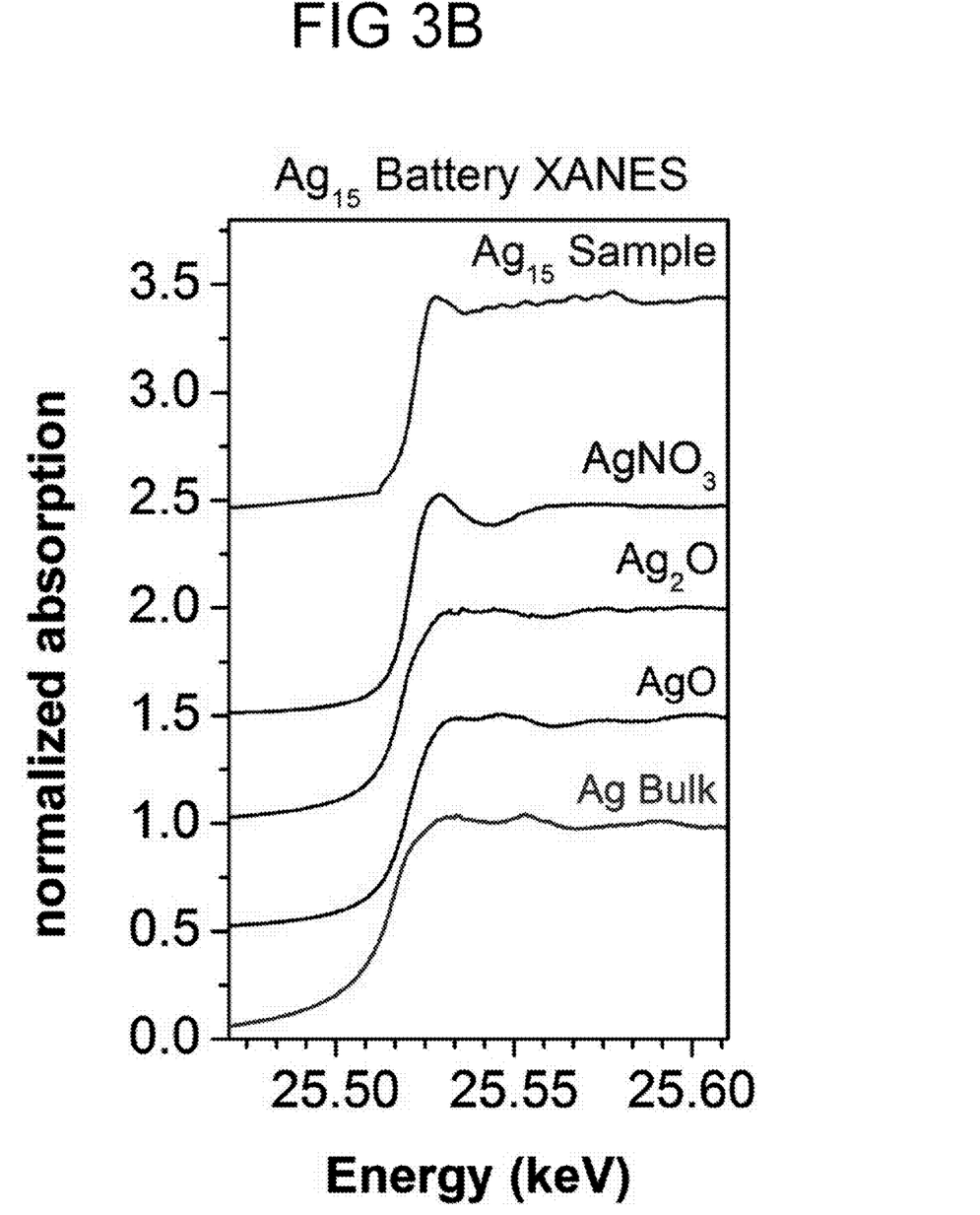
FIG. 3B is XANES spectra of the clusters depicted in FIG. 3A.

Size selected clusters were characterized as to size and composition on the cathode surface. Specifically, size selected Ag clusters were soft landed to prevent shattering or embedding in the support. In an embodiment of the invention, the quantity of clusters deposited on the support is below 15 percent of an atomic monolayer equivalent to prevent agglomeration of adjacent clusters. Evidence for this comes from TEM images of the Ag15 clusters in FIG. 3A, which depict 15 atom clusters and no aggregation. Since the deposition of the other cluster sizes was done in a similar manner, they do not agglomerate. The GIXANES spectra (FIG. 3B) of the clusters shown in FIG. 3A indicate that the Ag clusters on the alumina surface are partially oxidized with a stoichiometry similar to $Ag_2O$. Thus, similar to Pd nanoparticles prepared and deposited by the inventors, the surfaces of the silver-based clusters are partially covered with oxygen atoms. The total number of Ag atoms deposited was the same in each case providing for approximately the same number of metal atoms on the surface, but different size clusters. For example, the structure of the three atom silver clusters (Ag3) is flat while Ag15 is three dimensional. As such, some of the atoms in the Ag15 cluster will not be on the surface. Thus there will not be an equal number of surface sites. The cluster generator counts the total number of atoms deposited on the entire support, including deposition on passivation film regions and areas of the cathode not covered with passivation film.

However, the resulting density of clusters will also be different with a higher density of smaller clusters and smaller density of larger clusters. Thus, the results for the four cathodes prepared in this manner provide a precise method to investigate the effect of the metal cluster size and density on the Li—O2 battery results with elimination of effects from carbon defects of unknown type and density.

The performance of the four different silver clusters on the alumina passivated GC cathode as well as the alumina passivated GC cathode itself was then examined using a Swagelok-type cell (Solon, Ohio) composed of a lithium metal anode, electrolyte (1 M $LiCF_3SO_3$ in tetraethylene glycol dimethyl ether (TEGDME) impregnated into a glass fiber separator), and a porous cathode (13 mm diameter). Suitable electrolytes include, but are not limited to ethers, carbonates, amines, ionic liquids; salts: lithium triflates, LiPF6, LIBOB, and combinations thereof.

Figure 4:
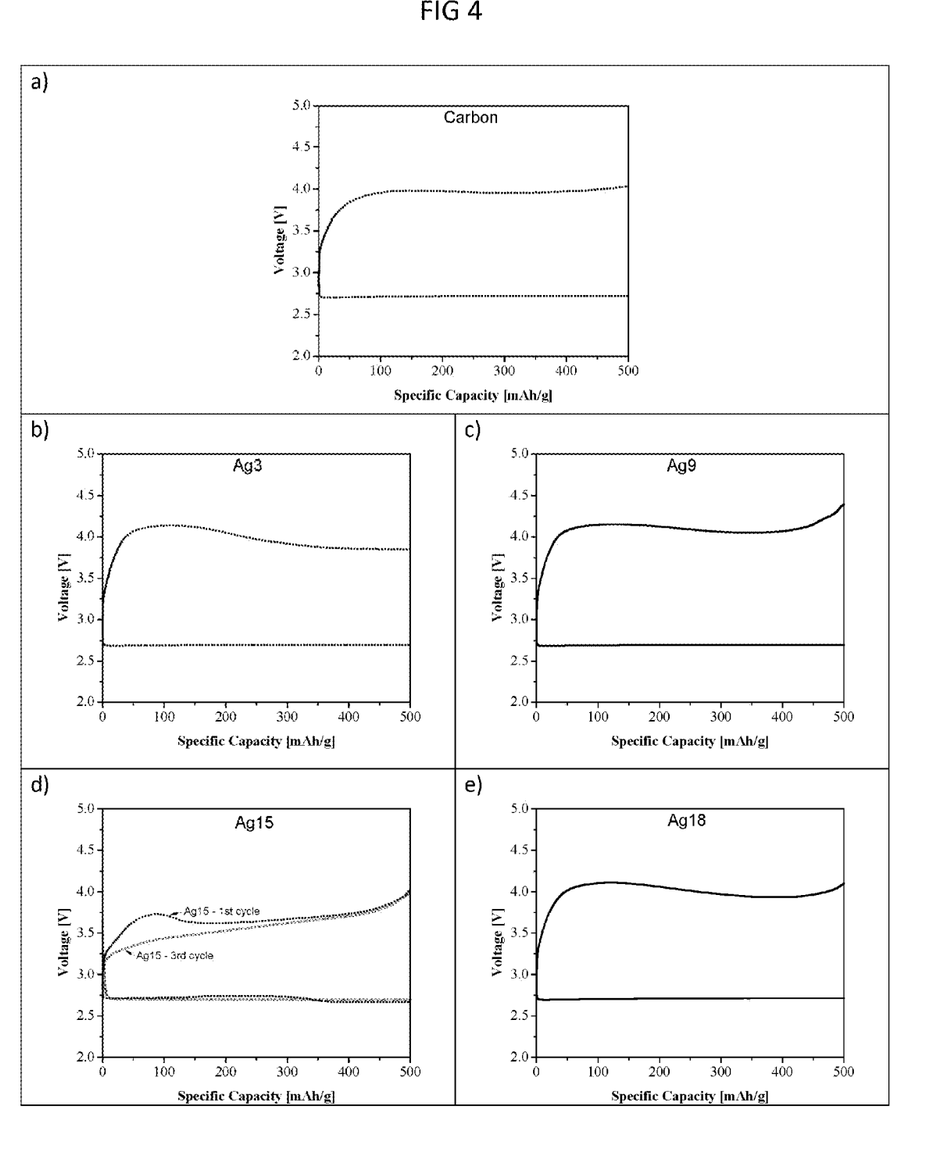

FIG. 4 shows voltage profiles recorded during the first discharge/charge cycle obtained for the five cathode architectures: graphitize carbon partially coated with $Al_2O_3$ ($C[Al_2O_3]$), and the $C[Al_2O_3]$ cathode coated with the four different cluster sizes [Ag3, Ag9, Ag15, and Ag18].

Figure 5:
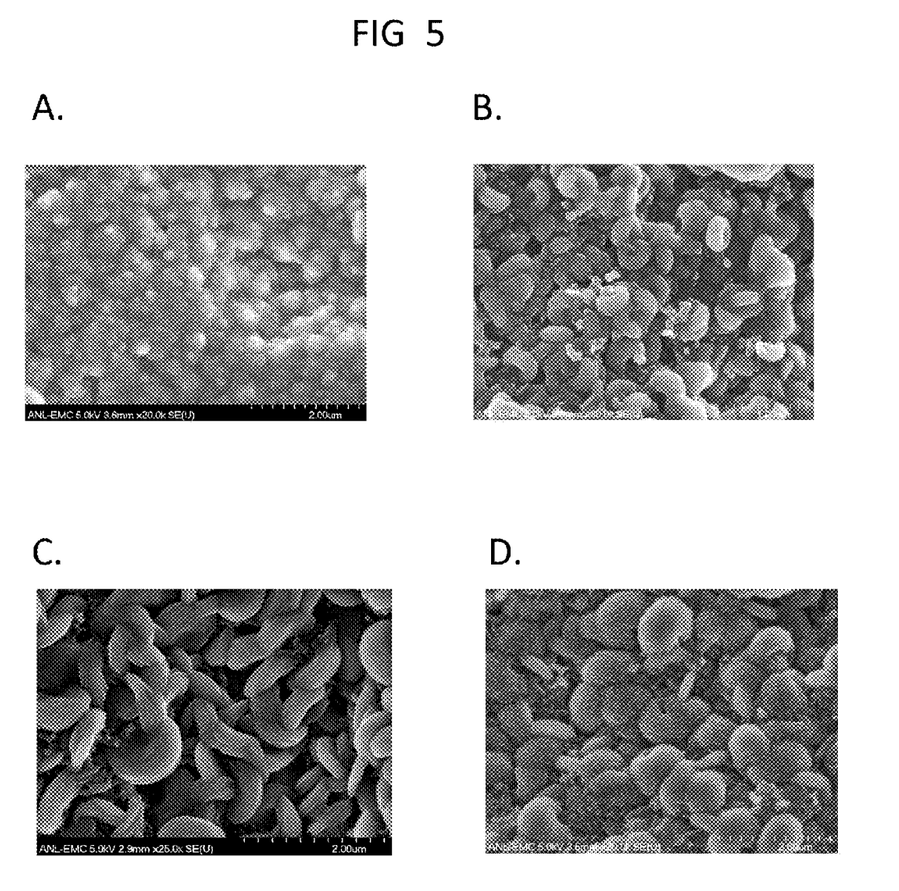

Surprisingly and unexpectedly, the discharge product resulting from the four cluster sizes have dramatically different morphologies depending on the specific Ag cluster size used as catalyst during discharge. SEM images in FIG. 5 show the carbon cathode after discharge to 2.3-2.5 V for the first cycle. The SEM images reveal that the discharge products resulting from Ag9 (FIG. 5B), Ag15 (FIG. 5C), and Ag18 (FIG. 5D) contain toroids while that of the Ag3 (FIG. 5A) cluster is film-like with no toroids. All of the discharge products were $Li_2O_2$.

The toroids depicted in FIG. 5 exhibit different surface morphology; especially notable is the difference between the discharge products for the two clusters of similar size, Ag15 and Ag18.

Figure 6:
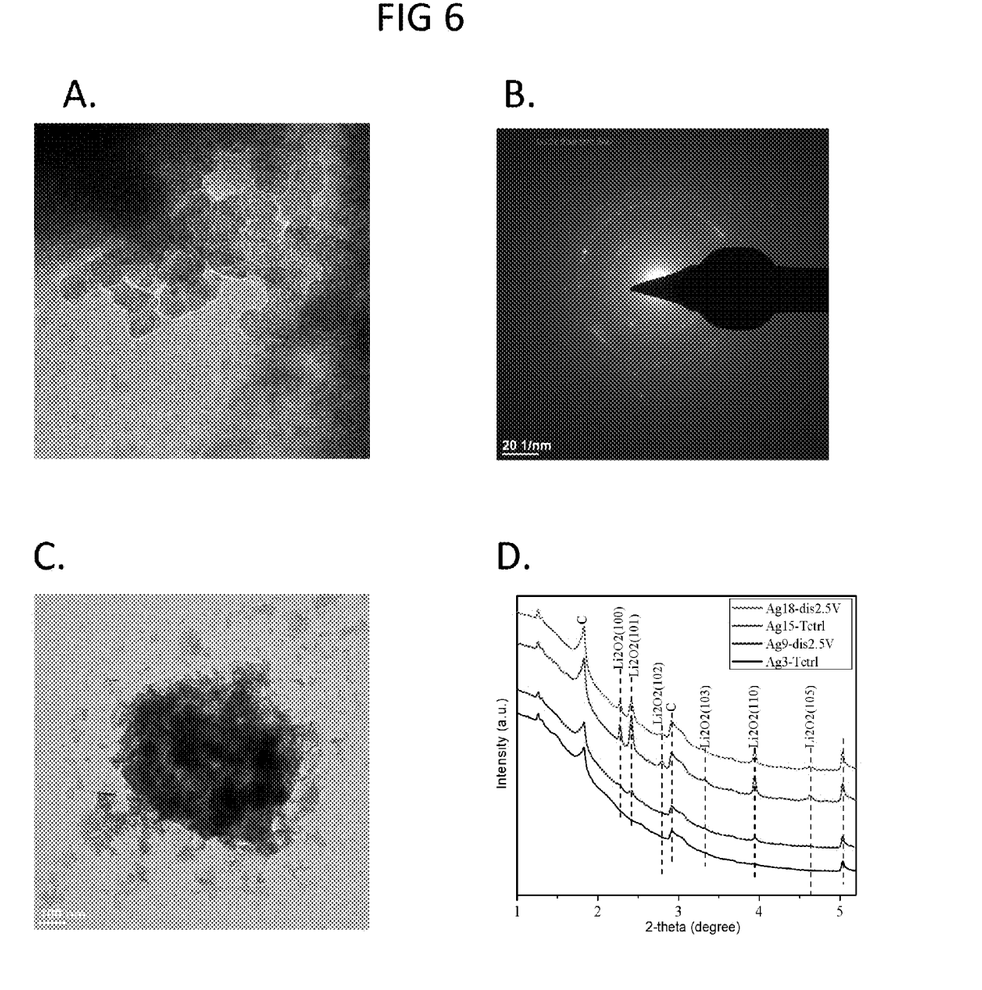

The lithium peroxide discharge product from the cathode was further probed by High Resolution Transmission Electron Microscopy (HRTEM) imaging and the results are shown in FIG. 6. The results show several distinct building blocks that make up the discharge products. The TEM image of the toroid-shaped $Li_2O_2$ created by the cathode with Ag15 clusters is shown in FIG. 6a along with an electron diffraction pattern in FIG. 6b, which is consistent with $Li_2O_2$. The electron diffraction pattern indicates that the toroids are nanocrystalline, i.e., made up of grains and grain boundaries. Evidence for the nanosized grains (~10 nm) is shown in FIG. 6a. The inventors observed that this crystalline structure serves as scaffolding within the cluster to facilitate electron transfer. In summary, the grain boundaries associated with the nanocrystalline structure of the Ag15 discharge product facilitates electron conduction, and therefore electronic conduction. The grain boundaries provide a network for electronic conductivity needed for charging discharged batteries.

The TEM image for the Ag18 clusters indicate that it is made up of nanorods and is distinctly different from that of the more spherical like grains found in the discharge product of the Ag15 clusters as are the SEM images. In the case of Ag9 the TEM images also show that the toroids are made up of nanorods as in the case of Ag18, although the surface morphology is somewhat different. Electron diffraction patterns show that the discharge product is $Li_2O_2$ for all four clusters.

The inventors found that the differences in morphology of discharge products and/or clusters can be due to an electrocatalytic effect that controls oxygen reduction rate as well as the nucleation and growth mechanism of discharge product.

In summary, metal catalysts can be used to control of the morphology of $Li_2O_2$ and other lithium oxides in Li-Air batteries. The clusters reduce the charge over potentials through introduction of amorphous conducting domains, increase capacities through faster oxygen reduction, and possibly cycle life with less reactive surface morphologies. It is noteworthy that the invention generates both amorphous and crystalline products. For example, nanocrystalline materials are composed of crystalline grains and amorphous grain boundaries exist between these crystalline structures.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for generating $Li_{2-x}O_2$ in a redox reaction wherein x is an integer between 0 and 2, the method comprising reacting lithium ions with oxygen ions in the presence of a catalyst, whereby the catalyst comprises individual metal clusters arranged as cluster fields on a cathode, such that each cluster comprises a predetermined number of metal atoms, the number selected from between 3 and 50, wherein a film covers at least a portion of the cathode, wherein the film is alumina having a thickness of up to about 1 nm.

2. The method as recited in claim 1 wherein the lithium ions originate from a lithium metal anode, the oxygen ions originate from air, and the clusters are selectively deposited on the cathode.

3. The method as recited in claim 2 wherein an electrolyte is positioned between the anode and the cathode.

4. The method as recited in claim 2 wherein the cathode is permeable to oxygen gas.

5. The method as recited in claim 2 wherein the cathode is at least partially overlaid with a film selected from the group consisting of oxides, carbides, nitrides and combinations thereof.

6. The method as recited in claim 1 wherein the metal is an element selected from the group consisting of Ag, Cu, Au, Ni, Pd, Pt, Zn, Mn, Co, and combinations thereof.

7. The method as recited in claim 1 wherein the metal is silver and the cluster consist of a predetermined number of atoms, that number taken from between 3 and 20 atoms.

8. $Li_{2-x}O_2$ generated by the method recited in claim 1, wherein the $Li_{2-x}O_2$ is toroidal in shape.

9. A lithium air battery comprising:
    a. a lithium metal anode;
    b. a cathode opposing the anode, wherein a film covers at least a portion of the cathode, wherein the film is alumina having a thickness of up to about 1 nm, said cathode supporting metal clusters, each cluster consisting of between 2 and 20 metal atoms wherein the clusters reside in certain regions on the cathode and not in other regions of the cathode; and
    c. an electrolyte positioned between the anode and the cathode.

10. The battery as recited in claim 9 wherein the cathode is oxygen gas permeable.

11. The battery as recited in claim 9 wherein the metal is an element selected from the group consisting of Ag, Cu, Au, Ni, Pd, Pt, Zn, Mn, Co, and combinations thereof.

12. The battery as recited in claim 9 wherein the cluster consists of 3 to 18 atoms of silver.

13. The battery as recited in claim 9 wherein the electrolyte is tetraglyme LiTriflate, or dimethoxyethane LiTriflate or dimethyl sulfoxide or lithium bis-trifluoromethanesulfonimide, or combinations thereof.

14. The battery as recited in claim 9 wherein the cathode has defects and the film covers the defects.

15. The battery as recited in claim 9 where the film is an oxide, or a carbide, or a nitride, or combinations thereof.

16. The battery as recited in claim 9 wherein the film has a thickness ranging from between about 0.5 nanometers and 1 nanometer.

17. The battery as recited in claim 9 wherein the film covers up to about 50 percent of a surface of the cathode opposing the anode.

18. The battery as recited in claim 9 wherein clusters are supported on the film while other clusters directly contact the cathode.

19. The battery as recited in claim 9 wherein all of the clusters consist of 15 atoms.

* * * * *